United States Patent
Artman et al.

(10) Patent No.: US 7,512,824 B2
(45) Date of Patent: Mar. 31, 2009

(54) SYSTEM AND METHOD FOR MANAGING POWER CONSUMPTION IN A COMPUTER SYSTEM HAVING A REDUNDANT POWER SUPPLY

(75) Inventors: Paul T. Artman, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 433 days.

(21) Appl. No.: 10/768,615

(22) Filed: Jan. 30, 2004

(65) Prior Publication Data

US 2005/0172157 A1    Aug. 4, 2005

(51) Int. Cl.
*G06F 11/30*    (2006.01)
(52) U.S. Cl. .................................... 713/340; 713/300
(58) Field of Classification Search .................. 713/300, 713/340
See application file for complete search history.

(56) References Cited

U.S. PATENT DOCUMENTS

| | | | | |
|---|---|---|---|---|
| 5,307,003 A | * | 4/1994 | Fairbanks et al. | 323/222 |
| 5,841,313 A | * | 11/1998 | Levin et al. | 327/393 |
| 2004/0178940 A1 | * | 9/2004 | Wittlinger | 341/144 |
| 2004/0255174 A1 | * | 12/2004 | Chen et al. | 713/300 |

OTHER PUBLICATIONS

Saito, "Power Device and Monitoring Circuit", Japanese Application 03-300482, Jun. 1, 1993.*

* cited by examiner

*Primary Examiner*—Tse Chen
(74) *Attorney, Agent, or Firm*—Baker Botts L.L.P.

(57) ABSTRACT

When a power supply of a redundant power supply array fails or is removed from the computer system, the operating speed of the processor is modulated or throttled, thereby reducing the rate of power consumption by the processor. Each power supply in the array is rated to a power delivery capacity that is less than the maximum power draw of the computer system.

15 Claims, 3 Drawing Sheets

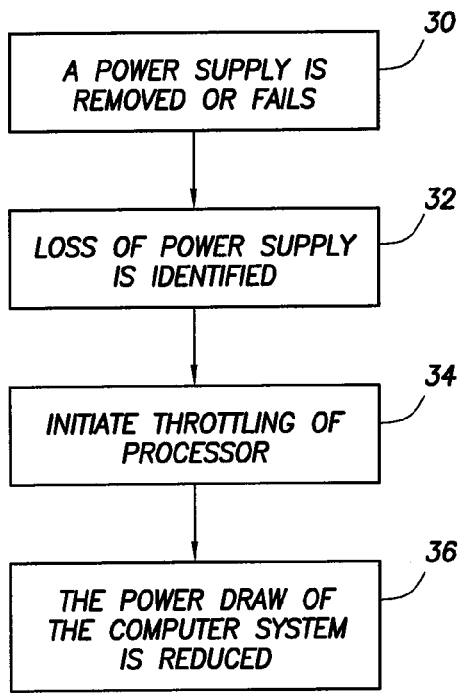
FIG.3
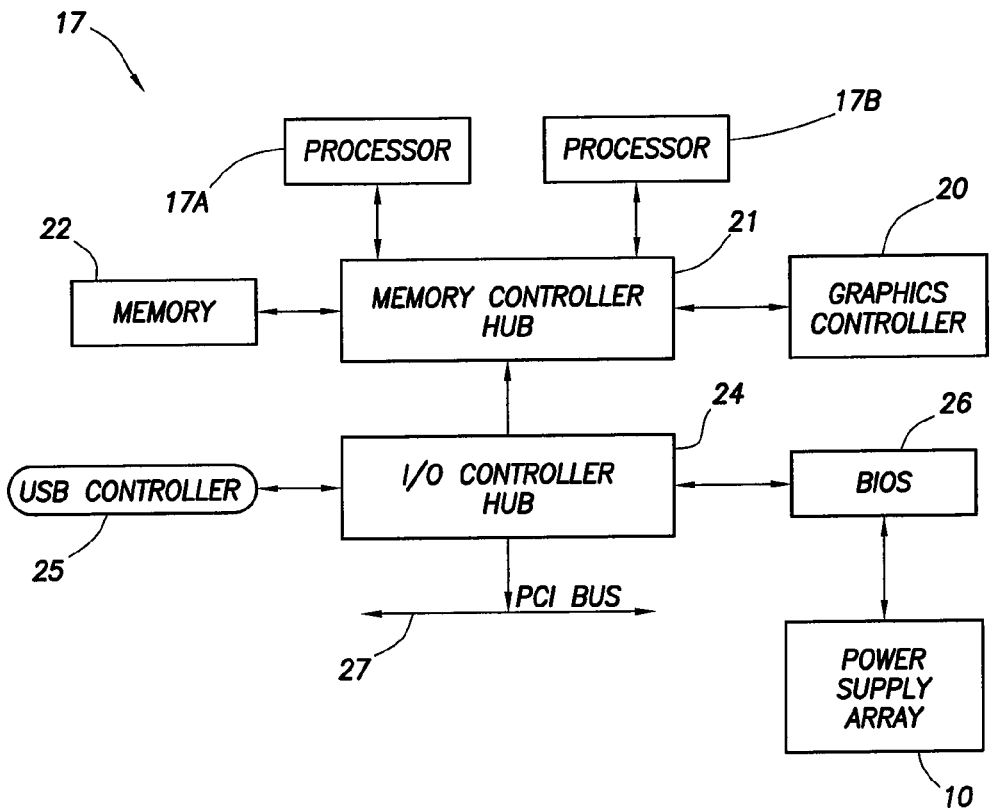
FIG.5
FIG.4

SYSTEM AND METHOD FOR MANAGING POWER CONSUMPTION IN A COMPUTER SYSTEM HAVING A REDUNDANT POWER SUPPLY

TECHNICAL FIELD

The present disclosure relates generally to the field of computer systems, and, more particularly, to a system and method for managing power consumption in a computer system having a redundant power supply.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include a processor, sometimes referred to as a microprocessor, and an associated chip set. Some computer systems, including server computer systems, may include a redundant power supply. One purpose of a redundant power supply is to have at least two independent power supply modules providing power to the computer system. If one of the power supply modules fails, the remaining power supply modules are able to power the computer system without an adverse effect on the operation of the computer system. Redundant power supplies are often organized as an array of individual power supplies. One configuration is an N+1 configuration. In an N+1 power supply configuration, one power supply in the power supply array can fail without affecting the performance of the computer system, as the computer system may continue to operate with N operational power supplies. If the power supply array includes only two power supplies in an N+1 configuration, each power supply must be sufficient to power the entire computer system. Each power supply, however, consumes space within the enclosure of the computer system. More powerful power supplies—those rated to deliver a higher wattage output—typically are larger than power supplies rated at a lower wattage output.

As computer systems become physically smaller, space within the enclosure of the computer system is at a premium. The use of an N+1 configuration in a power supply array having two power supplies mandates that each power supply be rated such that the power supply can power the highest power draw configuration of the computer system. The highest power draw configuration of the computer system is rarely, if ever, reached and typically involves the maximum use of hardware and software resources of the computer system during a period that the computer system is at an elevated ambient temperature. A computer system having an N+1 redundant power supply configuration will include at least two power supplies, each of which is physically large in size and is rated to accommodate a power draw event in the computer system that rarely, if ever, occurs.

SUMMARY

In accordance with the present disclosure, a system and method for managing power consumption in a computer system having a redundant power supply is disclosed. When a power supply of the redundant power supply array fails or is removed from the computer system, the operating speed of the processor is modulated or throttled, thereby reducing the rate of power consumption by the processor. Each power supply in the array is rated to a power delivery capacity that is less than the maximum power draw of the computer system. One technical advantage of the present disclosure is the system and method disclosed herein permits the use of power supplies having a smaller physical size, while maintaining a redundancy feature in the computer system. Another technical advantage of the present disclosure is a power conservation technique that involves the use of individual power supplies that are not rated to handle the maximum power draw of the computer system. Because the power consumption of the computer system is regulated in the event of a loss of a power supply, the individual power supplies of the computer system may be smaller in size and power output capacity without negatively affecting the performance of the computer system.

Another technical advantage of the system and method disclosed herein is that the modulation of the processor of the computer system need not be automatic. The power consumption of the computer system can be monitored while the power supply array is at less then full capacity. When the power draw of the computer system reaches or exceeds a predetermined threshold, the processor can be modulated. Another technical advantage of the system and method disclosed herein is that, in the case of multiple processor systems, the method disclosed herein may involve the modulation of only the processor having the highest operating speed. In this mode, the operation of those processors having lower operating speeds is unaffected. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a flow diagram for a method for modulating the operating speed of a processor;

FIG. 4 is a diagram of the architecture of a dual processor computer system;

FIG. 5 is a diagram of a look up table; and

DETAILED DESCRIPTION

The present disclosure concerns a system and method for managing power consumption in a computer system that includes a redundant power supply. The present disclosure describes a system and method in which the operation of the processor is regulated in the event that a power supply of the redundant power supply is arrayed fails or is removed from the computer system. As a result of the system and method disclosed herein, the individual power supplies of a power supply array may have a lower power rating, and therefore a smaller physical size, without negatively affecting the operation of the computer system.

Much of the power consumption in a computer system occurs at the processor of the computer system. The power consumption of the processor of the computer systems varies with the operating speed and the operating conditions of the processor. A processor that operates at a higher clock rate will consume more power than a processor that operates at a lower clock rate. The system and method of the present invention modulates the clock rate of the processor in those instances in which a power supply has failed or has been removed from the computer system. Because the power consumption of the computer system has been decreased by the modulation of the clock rate of the computer system, the functioning power supplies of the computer system are able to accommodate the power draw of the computer system. With respect to the operating conditions of the processor, the power consumption of the processor may be reduced by reducing the data rate of the processor's front side bus. Reducing the data rate of the processor's front side bus reduces the number of instructions that reach the processor, thereby reducing the power consumed by the processor. As another alternative for reducing the power consumption of the processor, the effective rate of the processor may be modulated by placing the processor successively in a sleep mode followed by an operational mode. The power consumption of the processor may also be reduced by reducing the voltage applied to the processor. Reducing the voltage applied to the processor typically reduces the clock rate of the processor.

Figure 1:
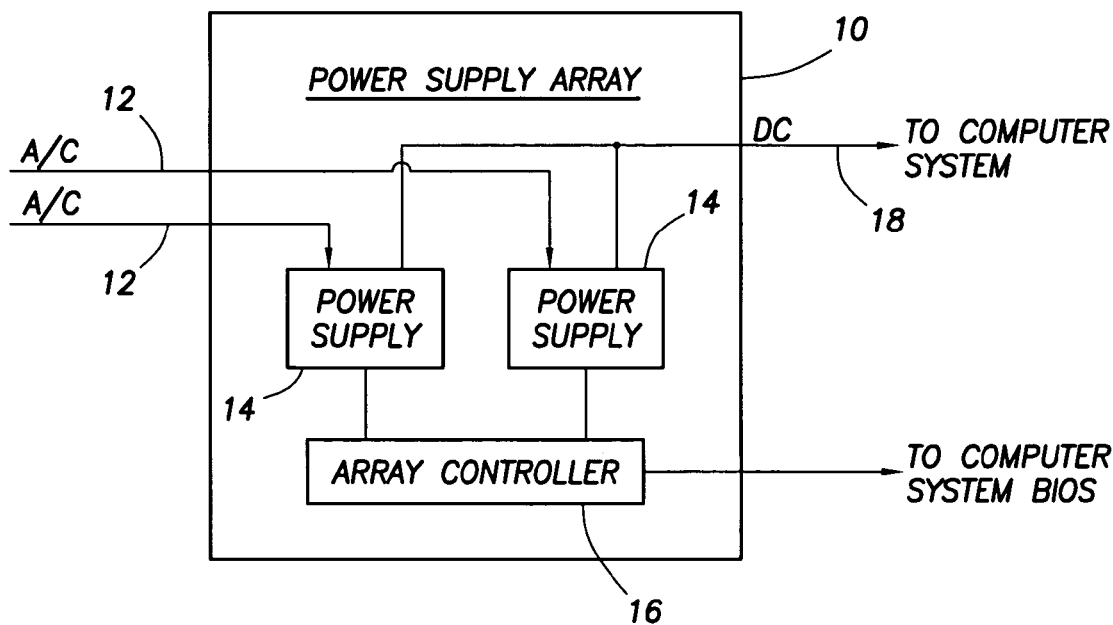
FIG. 1 is a diagram of the architecture of a power supply array.

The architecture of a power supply array 10 of a computer system is shown at FIG. 1. Power supply array 10 includes two power supplies 14, each of which is coupled to an array controller 16. Array controller 16 monitors the power output of each power supply and identifies when a power supply fails or is removed from the computer system. As indicated in FIG. 1, array controller 16 includes a communication link to the BIOS of the computer system. Each of power supplies 14 is coupled to an A/C power connection 12. Each A/C power connection 12 in FIG. 1 may be coupled to a separate power grid to protect against the risk of power loss from a connection to a single power grid. Each power supply provides as an output one or more direct current voltages connections, which are indicated at 18. These direct current voltage connections are typically supplied to the backplane or motherboard of the computer system and then distributed throughout the computer system. Each power supply 14 of FIG. 1 is not rated such that each alone can accommodate the maximum power draw of the computer system. Rather, each is rated so that each can accommodate the expected power draw of the computer system during some or most of the operating conditions typically experienced by the associated computer system. In this manner, the power supplies of the computer system are smaller physical size, when compared with the physical size of a power supply in an N+1 power supply array.

Figure 2:
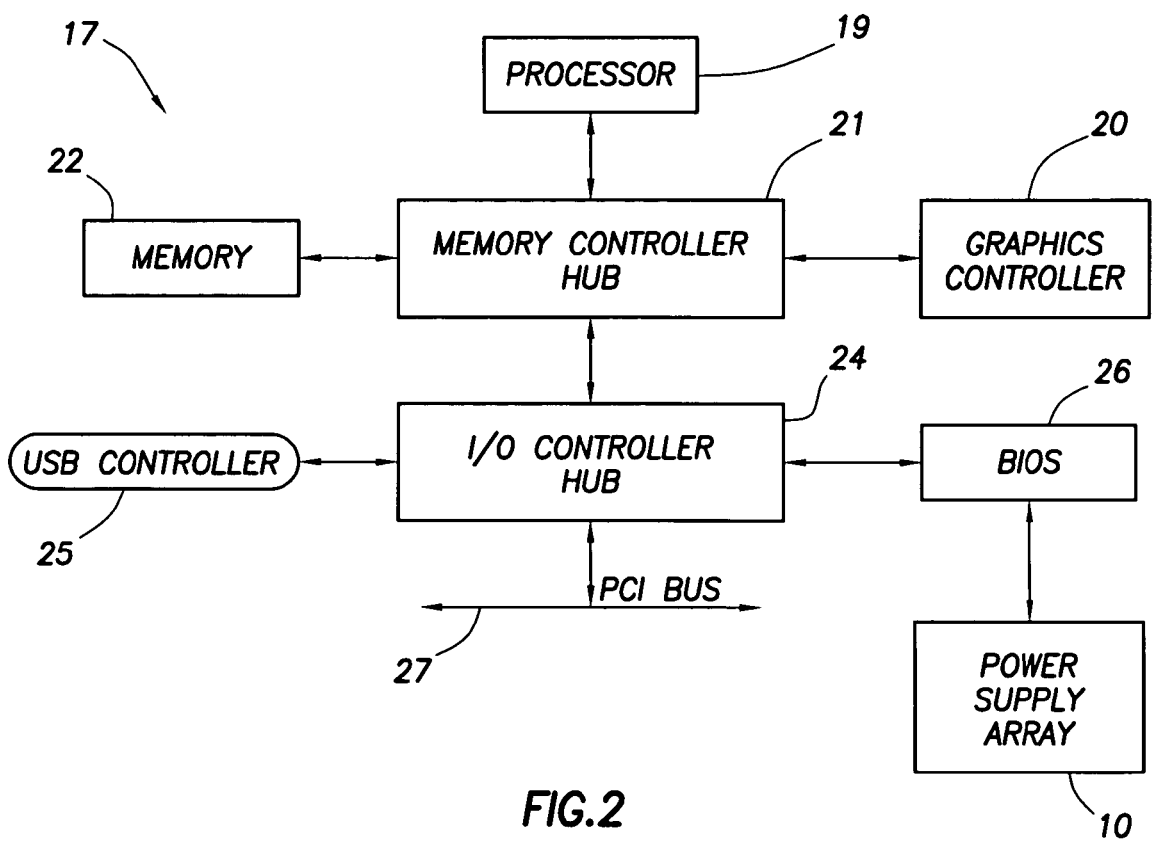
FIG. 2 is a diagram of the architecture of a computer system.

The architecture of a computer system, which is indicated generally at 17, is shown in FIG. 2. Computer system 17 includes a processor 19, which is coupled to a memory controller hub (MCH) 21. Memory controller hub 21 is coupled to a graphics controller 20 and system memory 22. Memory controller hub 21 is additionally coupled to an I/O controller hub (ICH) 24, which is coupled to a USB controller 25 and a PCI bus 27. I/O controller hub 24 is also coupled to BIOS 26, which is coupled via a communications link to the array controller of power supply array 10. BIOS 26 is able to assert certain signal line inputs to the processor through the I/O controller hub 24 and memory controller hub 21. With respect to certain processors manufactured by Intel® Corporation of Santa Clara, Calif., one such signal line input to the processor is the PROCHOT# (processor hot) input. The assertion of the PROCHOT signal line in certain Intel® processor, including at least some Intel® Pentium® 4 model processors, causes the processor to modulate its internal processor core clocks. The processor modulates its internal processor core clocks by turning the various clocks of the processor off and on according to a predetermined duty cycle, thereby reducing the effective rate of the clock.

A method for modulating or throttling the operating speed of a processor upon the loss of a power supply is shown in FIG. 3. At step 30, a power supply of the computer system fails or is removed from the computer system. At step 32, the loss of a power supply is recognized at the array controller of the power supply array. The array controller communicates this event to the BIOS of the computer system. At step 34, the BIOS of the computer system asserts the PROCHOT# command at the processor of the computer system, thereby causing the processor to modulate or throttle the clock or operating rates of the processor. The modulation of the clock rates of the processor reduces the power consumed by the computer system. Following these steps, the computer system is operating with only a single power supply. The rate of power consumption in the computer system, however, has been reduced through the modulation of the clocks of the computer system, thereby allowing the computer system to continue operating with only a single power supply that is not otherwise rated to handle the maximum power draw of a unmodified computer system.

Shown in FIG. 4 is an architecture of a dual processor computer system. The computer system of FIG. 2 is similar to that shown in FIG. 4, with the exception that the computer system of FIG. 4 is a dual processor computer system. In the event that a power supply of the power supply array fails or is removed from the computer system, the power consumption of the computer system may be reduced by modulating or throttling only the processor that has the highest clock rate of the multiple processors. In the event that the computer system includes multiple processors the BIOS may read a look up table to identify the processor having the highest clock rate. In the case of a multiple processors having varying operating speeds, upon receiving a notification from the power supply array that a power supply has failed or has been removed, the BIOS reads a look up table. An example of such a look up table is shown in FIG. 5. In the table 50 of FIG. 5, the processing speed of each processor is identified, and for each processor, there is an identification of whether the processor should be automatically throttled upon the loss of a power supply in the power supply array. In the example of FIG. 5, Processor 2 has an operating speed of 3.2 GHz and will be automatically throttled in the event of the loss of a power supply in the power supply array. Processor 1, which has a lower operating speed of 2.0 GHz, will not be automatically throttled in the event of a loss of a power supply. In this instance the modulate or FORCEPR# signal, which is a forced modulation signal asserted by the BIOS, is only asserted with respect to Processor 2.

Figure 6:
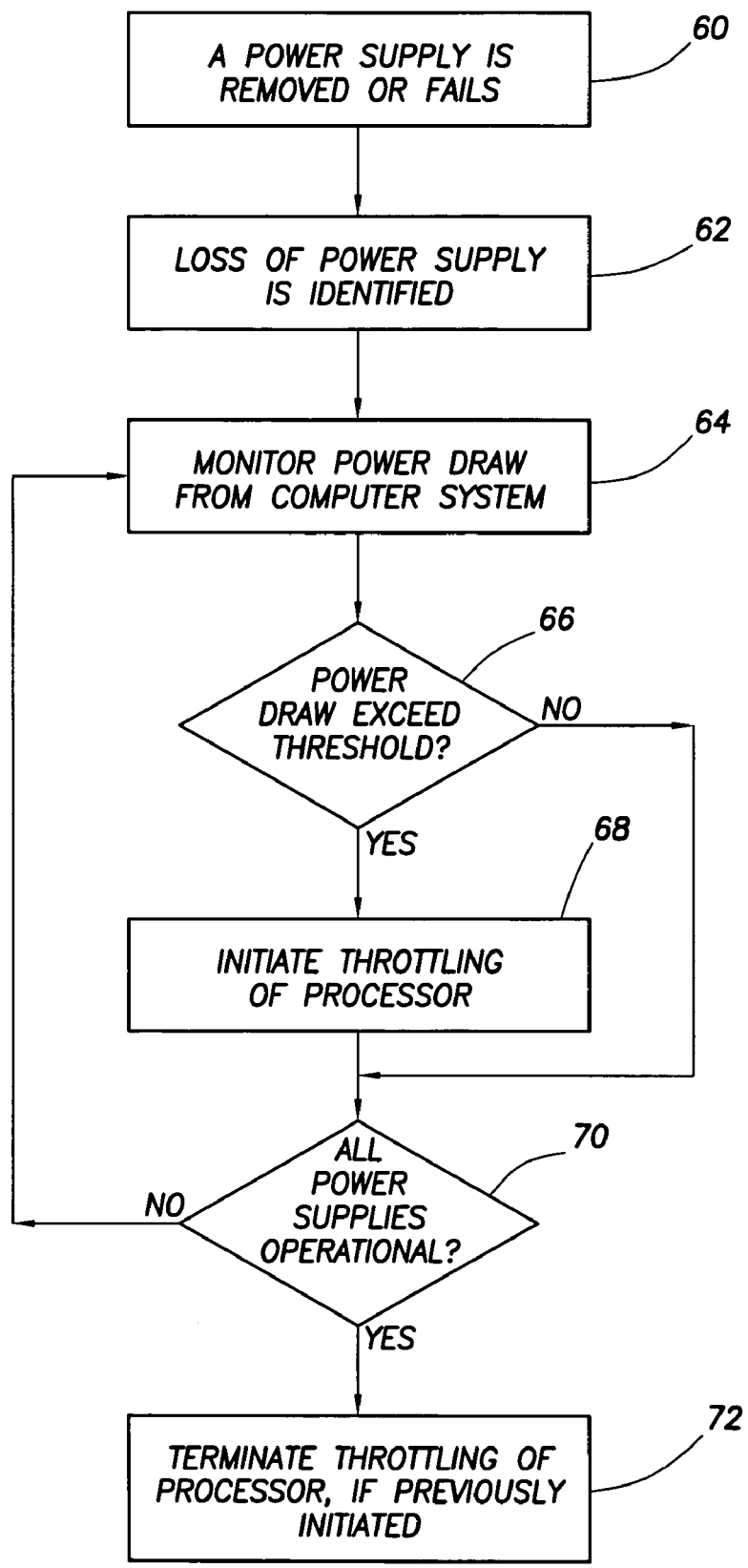
FIG. 6 is a flow diagram of a method for modulating the operating speed of a processor.

The modulation of one or more processor of the computer system need not be automatic in the case of a loss of a power supply. It is often the case that the power draw of the computer system will be sufficiently low that no modulation of the power supply will be necessary, even considering that the remaining power supply of the computer system is not rated to handle the maximum power draw of the computer system. In the method of FIG. 6, modulation of the processor or processors of the computer system is not initiated until the power supply draw of the computer system reaches a predetermined threshold, which may be, for example, 75% of the rated power of the remaining power supply. In this example, processor modulation for the purpose of reducing energy consumption in the computer system is not initiated until the power draw rate of the computer system reaches 75% of the rated capacity of the remaining functioning power supply.

At step 60 of FIG. 6, a power supply of the computer system fails or is removed from the computer system. At step 62, the loss of the power supply is identified by the controller of the power supply array, who communicates the loss of a power supply to the BIOS of the computer system. At step 64, the power draw of the computer system is monitored in order to determine whether the power draw of the computer system has reached the threshold level at which processor modulation is necessary. If it is determined at step 66 that the power draw of the computer system has reached the threshold level, modulation of the computer system is initiated at step 68. If it is determined at step 66 that the power draw of the computer system has not reached a threshold level, step 68 is skipped and the flow diagram continues at step 70. At step 70, it is determined whether all power supplies are operational. If all power supplies are not operational, the flow diagram continues at step 64 with the continued monitoring of the power draw of the computer system. If all power supplies become operations, throttling of the processor is discontinued at step 72.

The system and method disclosed herein is not limited to the precise architecture disclosed in the figures of the present disclosure. Rather, the system and method of the present disclosure could be employed with any suitable computer system architecture that involves the use of a redundant power supply. It should also be understood that the system and method disclosed herein is not limited in its application to a specific processor or processor family or to the application of a specific command to the processor. Rather, the system and method disclosed herein may be used with any processor able to modulate its power consumption through the modulation of one or more of its internal clocks. Although the present disclosure has been described in detail, it should be understood that various changes, substitutions, and alterations can be made hereto without departing from the spirit and the scope of the invention as defined by the appended claims.

What is claimed is:

1. A method for managing power consumption in a computer system having a processor, comprising the steps of: providing an array of redundant power supplies, wherein each power supply in the array of redundant power supplies is rated to a power delivery capacity that is less than a maximum power draw of the computer system; identifying by an array controller a loss of operation of a power supply of the array of redundant power supplies, wherein a total rated capacity of functioning power supplies of the array of redundant power supplies is less than the maximum power draw of the computer system; and reducing an operating speed of the processor of the computer system.

2. The method for managing power consumption in a computer system of claim 1, wherein the step of reducing the operating speed of the processor of the computer system comprises the step of asserting a signal to an input of the processor to cause the processor to enter a power management mode.

3. The method for managing power consumption in a computer system of claim 1, wherein the step of identifying the loss of operation of the power supply of the array of redundant power supplies comprises the step of notifying a BIOS of the computer system of the loss of operation of the power supply of the array of redundant power supplies.

4. The method for managing power consumption in a computer system of claim 3, wherein a signal at the processor is asserted by the BIOS of the computer system.

5. The method for managing power consumption in a computer system of claim 1, further comprising the step of increasing the operating speed of the processor in conjunction with operation of all power supplies of the array of redundant power supplies.

6. A computer system, comprising: an array of redundant power supplies, wherein each power supply of the array is rated to a power delivery capacity that is less than a maximum power draw of the computer system; and a processor; wherein an operating speed of the processor is reduced upon a loss of a power supply of the array of redundant power supplies, wherein the loss is identified by an array controller, whereby a power draw of the computer system is reduced to a level below a total rated capacity of functioning power supplies of the array, and wherein the total rated capacity of the functioning power supplies of the array is less than the maximum power draw of the computer system.

7. The computer system of claim 6, wherein the operating speed of the processor is reduced by an assertion of a signal at the processor to cause the processor to enter a system management mode.

8. The computer system of claim 6, wherein the array of redundant power supplies includes the array controller for identifying a failure or a removal of the power supply of the array of redundant power supplies.

9. The computer system of claim 6, further comprising a BIOS for receiving an indication of the loss of the power supply and for asserting a signal to cause the processor to reduce a clock speed of a clock in the processor.

10. The computer system of claim 6, further comprising a BIOS for receiving an indication of the loss of the power supply and for asserting a signal to cause a lower voltage level to be applied to the processor.

11. The computer system of claim 6, further comprising a BIOS for receiving an indication of the loss of the power supply and for asserting a signal to reduce a data rate of a front side bus of the processor.

12. A method for reducing a power draw of a computer system having an array of redundant power supplies, wherein each power supply is rated to a power delivery capacity that is less than a maximum power draw of the computer system, comprising the steps of: identifying by an array controller a loss of a power supply of the computer system, wherein a total rated capacity of functioning power supplies of the array is less than the maximum power draw of the computer system; determining whether the power draw of the computer system has reached or exceeded a predetermined threshold level; and causing a processor to enter a power conservation state when the power draw of the computer system reaches or exceeds the threshold level.

13. The method for reducing the power draw of a computer system of claim 12, wherein the step of causing the processor to enter the power conservation state comprises the step of causing the processor to reduce an effective rate of at least one internal clock of the processor.

14. The method for reducing the power draw of a computer system of claim 12, wherein the step of causing the processor to enter a power conservation state comprises the step of causing a lower voltage level to be applied to the processor.

15. The method for reducing the power draw of a computer system of claim 12, wherein the step of causing the processor to enter the power conservation state comprises the step of lowering a data rate of a front side bus of the processor.

* * * * *